(12) United States Patent
Nelson

(10) Patent No.: US 10,128,674 B2
(45) Date of Patent: Nov. 13, 2018

(54) APPARATUS AND METHOD FOR CHARGING AND DISCHARGING A MULTIPLE BATTERY SYSTEM

(71) Applicant: Larry Nelson, Dyersburg, TN (US)

(72) Inventor: Larry Nelson, Dyersburg, TN (US)

(*) Notice: Subject to any disclaimer, the term of this patent is extended or adjusted under 35 U.S.C. 154(b) by 146 days.

(21) Appl. No.: 15/235,164

(22) Filed: Aug. 12, 2016

(65) Prior Publication Data

US 2016/0352131 A1  Dec. 1, 2016

Related U.S. Application Data

(63) Continuation-in-part of application No. 14/973,143, filed on Dec. 17, 2015, which is a continuation-in-part of application No. 13/276,738, filed on Oct. 19, 2011.

(60) Provisional application No. 61/394,439, filed on Oct. 19, 2010, provisional application No. 61/482,881, filed on May 5, 2011.

(51) Int. Cl.
*H02J 7/00* (2006.01)
*B60L 11/18* (2006.01)
*H02K 53/00* (2006.01)
*H02J 7/14* (2006.01)

(52) U.S. Cl.
CPC ......... *H02J 7/0068* (2013.01); *B60L 11/1805* (2013.01); *B60L 11/1816* (2013.01); *B60L 11/1853* (2013.01); *B60L 11/1855* (2013.01); *B60L 11/1861* (2013.01); *B60L 11/1868* (2013.01); *H02J 7/0024* (2013.01); *H02J 7/1423* (2013.01); *H02J 7/1461* (2013.01); *H02K 53/00* (2013.01); *B60L 2240/547* (2013.01); *Y02T 10/641* (2013.01); *Y02T 10/7005* (2013.01); *Y02T 10/7044* (2013.01); *Y02T 10/7055* (2013.01); *Y02T 10/7066* (2013.01)

(58) Field of Classification Search
CPC ..................................................... H02J 7/0068
USPC ....................................................... 307/10.1
See application file for complete search history.

(56) References Cited

U.S. PATENT DOCUMENTS

| 3,667,025 A | 5/1972 | Campbell et al. |
| 3,845,835 A | 11/1974 | Petit |
| 4,743,830 A | 5/1988 | Lakey |
| 5,680,908 A | 10/1997 | Reed |

(Continued)

OTHER PUBLICATIONS

Valve-Regulated Lead-Acid (VRLA): Gelled Electrolyte (gel) and Absorbed Glass Mat (AGM) Batteries; Deka Battery Technical Manual, pp. 1-16.

*Primary Examiner* — Joseph Chang
(74) *Attorney, Agent, or Firm* — Luedeka Neely Group, P.C.

(57) ABSTRACT

A multiple battery charging and discharging system controls the configuration of multiple batteries arranged in multiple battery banks. The batteries within each bank are connected in series when powering an electrical load, such as a service motor, and are connected in parallel when charging. A microprocessor monitors the voltage levels of the batteries in each bank and controls relays to switch the electrical load over to a charged battery bank when the voltage level of the discharging battery bank drops below a minimum run threshold. The microprocessor also monitors the voltage levels of the charging battery bank and controls relays to cease charging when the voltage level rises above a minimum charge threshold.

16 Claims, 9 Drawing Sheets

(56) References Cited

U.S. PATENT DOCUMENTS

| | | |
|---|---|---|
| 5,793,189 A | 8/1998 | Kawaguchi et al. |
| 5,821,729 A | 10/1998 | Schmidt et al. |
| 6,057,666 A | 5/2000 | Dougherty et al. |
| 6,140,799 A | 10/2000 | Thomasson |
| 6,239,578 B1 | 5/2001 | Schnell et al. |
| 6,734,645 B2 | 5/2004 | Auerbach |
| 6,741,065 B1 * | 5/2004 | Ishii .................. B60L 11/1816 320/122 |
| 7,042,176 B2 | 5/2006 | Wobben |
| 7,095,126 B2 | 8/2006 | McQueen |
| 7,183,746 B1 | 2/2007 | Carter |
| 7,388,299 B2 | 6/2008 | Blackman |
| 9,356,458 B2 | 5/2016 | Nevins |
| 2005/0173996 A1 | 8/2005 | Ellison |
| 2009/0288695 A1 | 11/2009 | Jaisinghani |
| 2009/0322287 A1 * | 12/2009 | Ozeki .................. H02J 7/0018 320/145 |
| 2010/0006351 A1 | 1/2010 | Howard |
| 2010/0184560 A1 | 7/2010 | Campbell |
| 2010/0270883 A1 | 10/2010 | Teoh et al. |

* cited by examiner

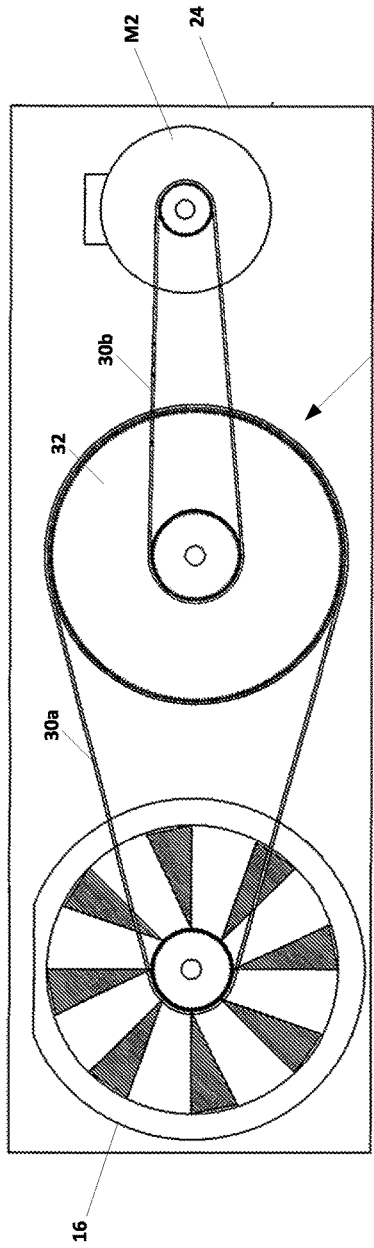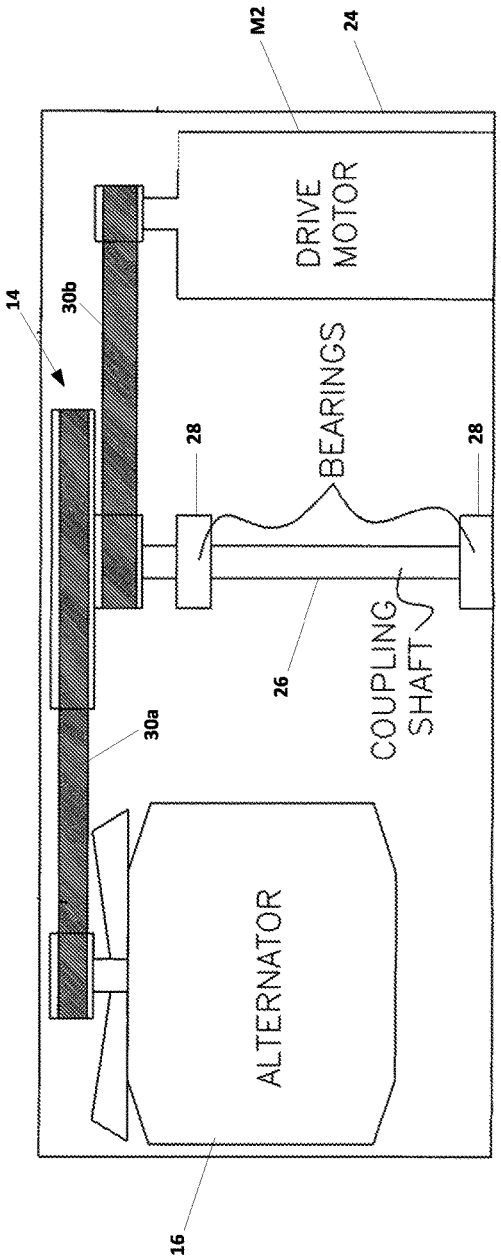
FIG. 2A
FIG. 2B

APPARATUS AND METHOD FOR CHARGING AND DISCHARGING A MULTIPLE BATTERY SYSTEM

RELATED APPLICATIONS

This application claims priority as a continuation-in-part of nonprovisional patent application Ser. No. 14/973,143, filed Dec. 17, 2015, titled APPARATUS AND METHOD FOR CHARGING AND DISCHARGING A DUAL BATTERY SYSTEM, which claims priority to nonprovisional patent application Ser. No. 13/276,738, filed Oct. 19, 2011, titled APPARATUS AND METHOD FOR CHARGING AND DISCHARGING A DUAL BATTERY SYSTEM, which claimed priority to provisional patent application Ser. Nos. 61/394,439, filed Oct. 19, 2010, and 61/482,881, filed May 5, 2011, both titled APPARATUS AND METHOD FOR CHARGING AND DISCHARGING A DUAL BATTERY SYSTEM the entire contents of which are incorporated herein by reference.

BACKGROUND

Although momentum is growing in the development and manufacture of electric vehicles, the success of such vehicles in everyday use will continue to be limited if there is no substantial improvement in their range of travel. Current battery technology used in electric vehicles limits the range of the vehicles, thus requiring frequent stops for recharging. Due to the time and effort required to recharge the batteries of an electric vehicle and the limited driving distance of such vehicles on a single charge, there is a need to extend the run time of electric vehicle batteries and to use battery power more efficiently.

Some solutions have been proposed in recent years, but they are lacking for various reasons. For example, US Patent Publication No. 2010/0184560A1 describes a system that incorporates two battery banks with a switching network that switches between the two banks for alternate charging and discharging. This system requires a separate drive motor/alternator set for each bank of batteries, which means two drive motor/alternator sets are needed to recharge the two battery banks. This requirement is a significant disadvantage as it adds more weight to the vehicle, and therefore decreases overall efficiency.

U.S. Pat. No. 6,734,645 describes an electric automobile that includes one or more free-turning wheels which each drive a generator via a gearbox. The generator charges one of a pair of battery packs while the other non-charging battery pack powers an electric motor that turns a pair of wheels through a differential. When the battery pack powering the electric motor nears depletion, a switching network switches in the generator to charge the depleted battery and switches in the charged battery to power the electric motor. Driving a generator through a gearbox attached to a vehicle's wheel as described in this patent is an inefficient way to generate electrical power to recharge vehicle batteries.

What is needed is a system for recharging one battery pack while another battery pack powers the vehicle, which efficiently switches between the depleted and charged battery packs, and which adds no unnecessary weight to the vehicle.

SUMMARY

The above and other needs are met by an apparatus for charging batteries and discharging batteries to power an electrical load. A preferred embodiment of the apparatus includes a first battery bank comprising one or more batteries and a second battery bank comprising one or more batteries. A battery charging circuit is operable to provide a charging voltage to one or both of the first and second battery banks. One or more first switches are operable to selectively connect or disconnect the first battery bank to or from the electrical load, thereby providing power to or removing power from the electrical load. One or more second switches are operable to selectively connect or disconnect the second battery bank to or from the electrical load, thereby providing power to or removing power from the electrical load. One or more third switches are operable to selectively connect or disconnect the first battery bank or the second battery bank to or from the battery charging circuit, thereby providing power to or removing power from the battery charging circuit. One or more fourth switches are operable to selectively connect the first battery bank to the battery charging circuit to receive the charging voltage and operable to selectively disconnect the second battery bank from the battery charging circuit. The one or more fourth switches are also operable to selectively connect the second battery bank to the battery charging circuit to receive the charging voltage and operable to selectively disconnect the first battery bank from the battery charging circuit.

Some embodiments include a microcontroller that is operable to control the first, second, third and fourth switches. In some embodiments, the microcontroller monitors the voltages of the batteries in the first and second battery banks, and controls the first, second, third and fourth switches based on the voltages monitored.

In some embodiments, the first battery bank includes multiple batteries and the second battery bank includes multiple batteries. The first switches are operable to connect the multiple batteries of the first battery bank in series when providing power to the electrical load or the battery charging circuit. The second switches are operable to connect the multiple batteries of the second battery bank in series when providing power to the electrical load or the battery charging circuit. The fourth switches are operable to connect the multiple batteries of the first battery bank in parallel when receiving the charging voltage from the battery charging circuit. The fourth switches are also operable to connect the multiple batteries of the second battery bank in parallel when receiving the charging voltage from the battery charging circuit.

Some embodiments of the apparatus include a blending and battery charging circuit for receiving power from a solar power source, a wind power source and an electrical utility power grid, and for providing a charging voltage to the first battery bank or the second battery bank. This embodiment also includes one or more fifth switches configured to selectively connect or disconnect the blending and battery charging circuit to or from the first or second battery banks.

In some embodiments, the electrical load comprises electrical lighting, electronic components, electrical appliances, an electric motor driving a transmission of an electric vehicle, an electric motor driving a propeller, or an electric motor driving an electrically-powered tool. In some embodiments, the electrical load comprises a residential power buss that provides power for home lighting, appliances and electronics.

In another aspect, an embodiment of the invention provides a method for charging and discharging a first battery bank comprising one or more batteries and a second battery bank comprising one or more batteries. The first and second battery banks selectively provide power to an electrical load and to a battery charging circuit that generates a charging voltage. The first and second battery banks also selectively receive the charging voltage from the battery charging circuit. The method includes the following steps:

(a) connecting the first battery bank to the electrical load to provide power to the electrical load;
(b) monitoring a voltage of one or more of the batteries of the first battery bank;
(c) after the voltage of one or more of the batteries of the first battery bank drops to or below a first threshold voltage,
   (c1) disconnecting the first battery bank from the electrical load,
   (c2) connecting the second battery bank to the electrical load and the battery charging circuit to provide power to the electrical load and the battery charging circuit,
   (c3) connecting the first battery bank to the battery charging circuit to receive the charging voltage,
   (c4) charging the first battery bank,
(d) after the voltage of one or more of the batteries of the first battery bank reaches or rises above a second threshold voltage, disconnecting the first battery bank from the battery charging circuit;
(e) monitoring a voltage of one or more of the batteries of the second battery bank;
(f) after the voltage of one or more of the batteries of the second battery bank drops to or below the first threshold voltage,
   (f1) disconnecting the second battery bank from the electrical load,
   (f2) connecting the first battery bank to the electrical load and the battery charging circuit to provide power to the electrical load and the battery charging circuit,
   (f3) connecting the second battery bank to the battery charging circuit to receive the charging voltage; and
   (f4) charging the second battery bank, and
(g) after the voltage of one or more of the batteries of the second battery bank rises to or above the second threshold voltage, disconnecting the second battery bank from the battery charging circuit.

In some embodiments, step (c3) includes connecting the batteries of the first battery bank in parallel, and step (f3) further comprises connecting the batteries of the second battery bank in parallel.

In some embodiments, steps (a) and (f2) include connecting the batteries of the first battery bank in series, and step (c2) includes connecting the batteries of the second battery bank in series.

BRIEF DESCRIPTION OF THE DRAWINGS

Advantages of the invention are apparent by reference to the detailed description in conjunction with the figures, wherein elements are not to scale so as to more clearly show the details, wherein like reference numbers indicate like elements throughout the several views, and wherein:

FIGS. 2A and 2B depict an embodiment of a charging voltage source of a dual battery charging and discharging system;

DETAILED DESCRIPTION

As the term is used herein, "dual battery" refers to two banks of batteries that are alternately charged and discharged while providing power to an electrical load. Generally, one bank of batteries is used to power the load while the other bank of batteries is being charged or is on standby after charging. Although a preferred embodiment uses two banks of batteries in a charge-discharge rotation, other numbers of battery banks could be used in such a rotation. Thus, it will be appreciated that the invention is not limited to any particular number of battery banks in the charge-discharge rotation.

Figure 1:
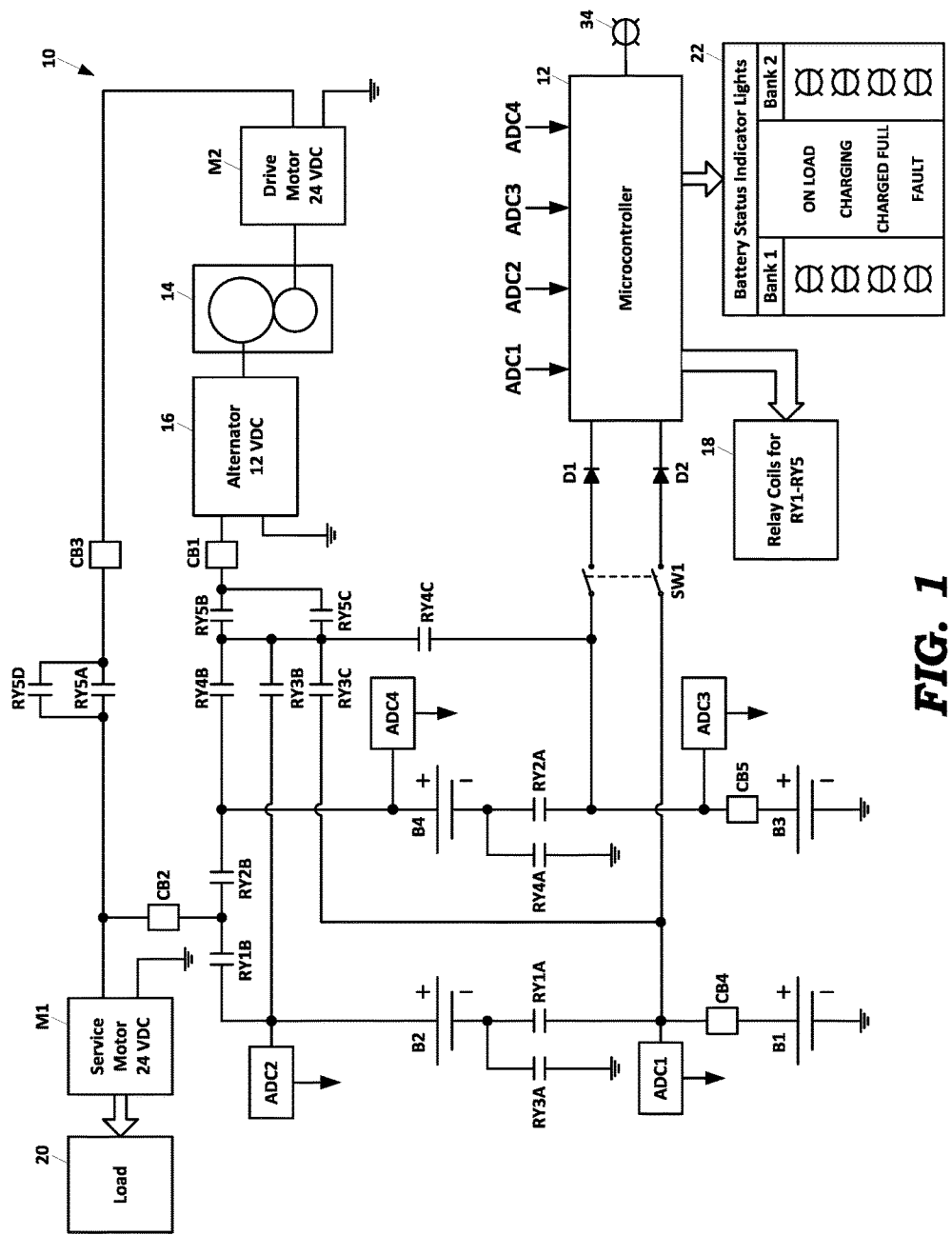
FIG. 1 is a schematic diagram of an embodiment of a dual battery charging and discharging system.

As shown in FIG. 1, a preferred embodiment of a dual battery charging-discharging circuit 10 includes four 12 VDC batteries, B1, B2, B3, and B4. The batteries B1 and B2 comprise a first bank of batteries, and batteries B3 and B4 comprise a second bank of batteries. When batteries B1 and B2 are discharging to power the load, they are connected in series to provide 24 VDC. When batteries B1 and B2 are being charged, they are connected in parallel to a 12 VDC charging voltage source 16, which is also referred to herein as a battery charging circuit. In the embodiment of FIG. 1, the battery charging circuit 16 comprises an alternator. Similarly, batteries B3 and B4 are connected in series when discharging to power a 24 VDC load, and they are connected in parallel for charging at 12 VDC. Although a preferred embodiment uses two batteries in each bank, other numbers of batteries in each bank could be used. Thus, it will be appreciated that the invention is not limited to any particular number of batteries in each bank.

In a preferred embodiment, connections to the two battery banks are rotated to alternately provide power to an electric service motor M1 driving a mechanical load 20. For example, the service motor M1 may be in an electric vehicle and the mechanical load 20 is the drive train of the vehicle. Alternatively, the service motor M1 may be a trolling motor on a boat wherein the load 20 is the propeller of the trolling motor. It should be appreciated that the invention is not limited to any particular application of the service motor M1. In alternative embodiments, the electrical load powered by the battery banks is something other than a motor, such as electrical lights or other electrical devices in a vehicle or water craft or building or any other mobile or fixed structure. Thus, the invention is not limited to any particular type of electrical load being powered. The invention may also be used in various other applications, such as lawn mowers, air conditioners, all-terrain vehicles, and turbo-type devices for driving a generator.

As shown in FIG. 1, the parallel or series configuration of the batteries is determined by the states of relays RY1A, RY1B, RY2A, RY2B, RY3A, RY3B, RY3C, RY4A, RY4B, RY4C, RY5A, RY5B, RY5C and RY5D, which are controlled by a microcontroller 12. As described in more detail below, the microcontroller 12 controls the relay coils 18 based on voltage levels measured at four nodes in the circuit 10. Preferably, these voltage levels are measured by voltage sensors connected to analog-to-digital converters ADC1, ADC2, ADC3, and ADC4. The microcontroller 12 also controls a set of indicator lights 22 to provide information to an operator about the status of each bank of batteries. The microcontroller 12 is powered by battery B1 through diode D2 or battery B3 through diode D1, depending on which bank of batteries is being discharged or charged at any particular time. Power to the microcontroller 12 is controlled by a master switch SW1. Preferably, when the microcontroller 12 is in an OFF state, all relays are in an open state.

The relays RY1A and RY1B are also referred to herein as first switches. The relays RY2A and RY2B are also referred to herein as second switches. The relays RY5A and RY5D are also referred to herein as third switches. The relays RY3A, RY3B, RY3C, RY4A, RY4B, RY4C, RY5B and RY5C are also referred to herein as fourth switches.

Preferred embodiments of the circuit 10 include a drive motor M2 that drives a 12 VDC voltage source 16, such as an alternator, through a gear-reduction drive train 14. In the embodiment of FIG. 1, the drive motor M2 is a 24 VDC motor powered by the series combination of batteries B1 and B2 or the series combination of batteries B3 and B4. As shown in FIG. 1, the output of the alternator 16 may be connected across the parallel bank of batteries B1 and B2 or across the parallel bank of batteries B3 and B4, depending on the state of the relays.

As shown in FIG. 2, the drive motor M2, the drive train 14 and the alternator 16 may be packaged in a housing 24 to provide a self-contained charging voltage source in the form of a power converter (24 VDC input to 12 VDC output). In the embodiment of FIG. 2, the drive train 14 includes a pair of belts 30a and 30b connected to a pulley pair 32 connected to a coupling shaft 26 and a set of bearings 28. In one preferred embodiment, the gear ratio provided by the pulley pair 32 is 6.22:1. In this embodiment, if the drive motor M2 is running at 750 RPM, the alternator is turning at 4665 RPM. The drive motor M2 may operate at 24 VDC and pull 5-6 Amps to provide 0.25 HP. The alternator 16 may provide 13.75-14.00 Amps when turning at 1000-2500 RPM.

As one skilled in the art will appreciate, many different combinations of gear ratio and drive motor RPM may be implemented to spin the alternator 16 at an RPM sufficient to generate the desired output power from the alternator 16. Preferably, the gear ratio and drive motor RPM combination will provide an output power from the alternator 16 sufficient to charge one bank of batteries up to a minimum charge voltage before the other bank of batteries, which is driving the drive motor M2 and the service motor M1, is discharged below a minimum run voltage. The gear reduction in the drive train 14 is key to reducing the amount of current drawn by the drive motor M2 while driving the alternator 16. The reduced current pull from the drive motor M2, while the discharging battery bank is also running the service motor M1, results in the discharging battery bank lasting long enough to fully charge the other battery bank.

It should also be appreciated that the drive train 14 may comprise a gear set or other transmission means to achieve the desired gear reduction ratio. Thus, the invention is not limited to any particular mechanism for achieving gear reduction.

As depicted in FIG. 1, some embodiments include circuit breakers CB1-CB5 to protect sensitive components of the circuit 10 from over-current conditions. In one embodiment, circuit breaker CB2 is rated at 40 amps and the other breakers are rated at 20 amps.

Figure 3:
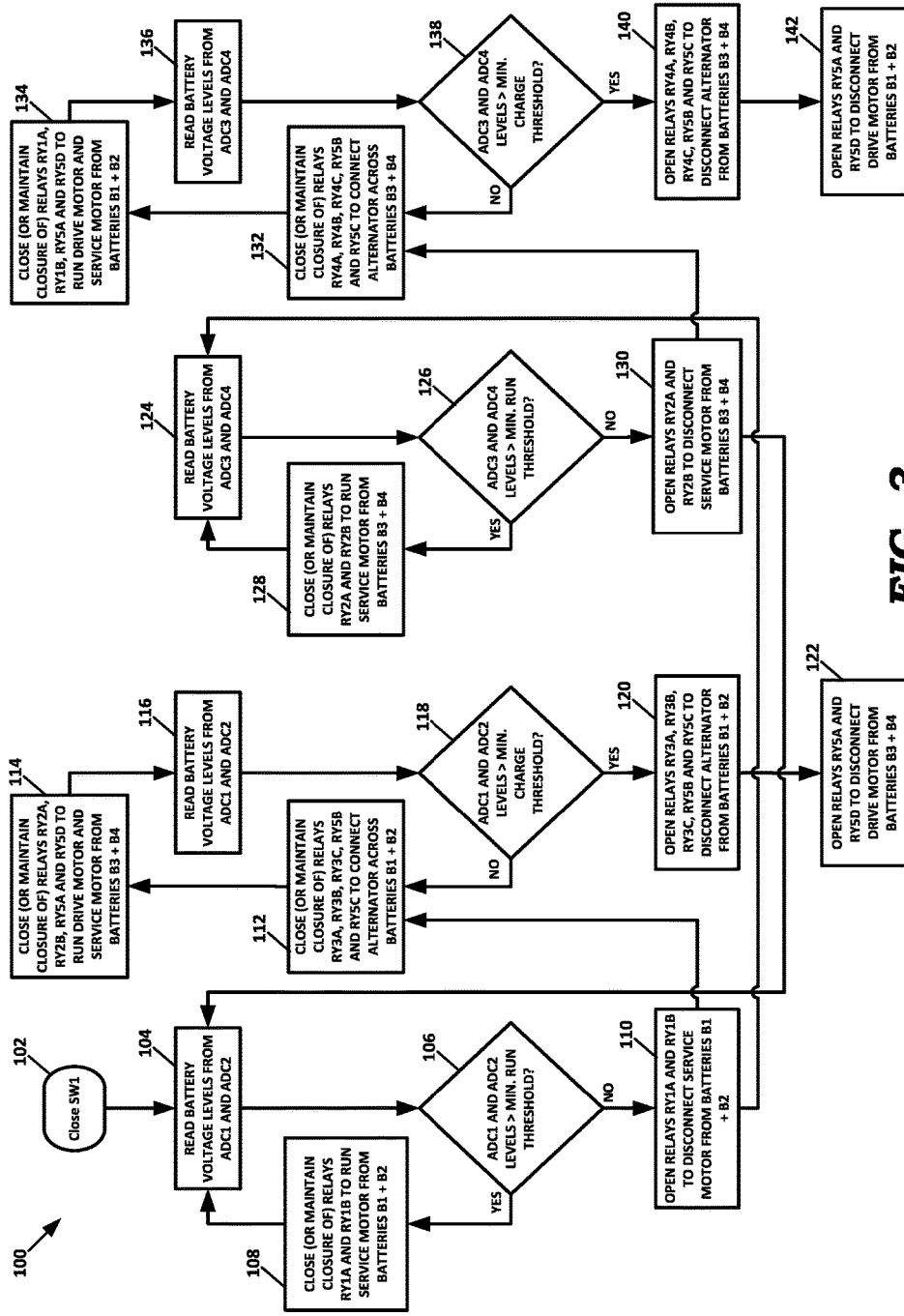
FIG. 3 depicts a functional flow diagram of a process for operating a dual battery charging and discharging system.

Referring now to FIG. 3, a process 100 for operating the circuit 10 is described. Preferably, the process starts when the master switch SW1 is closed (step 102), at which time the microcontroller 12 reads the battery voltages of batteries B1 and B2 from ADC1 and ADC2 (step 104). If the voltages of batteries B1 and B2 are both above a minimum run voltage threshold, such as 12.2 VDC (step 106), the microcontroller 12 closes relays RY1A and RY1B to provide 24 VDC power to the service motor M1 from the series combination of batteries B1 and B2 (step 108), and the microcontroller 12 continues monitoring the voltages of batteries B1 and B2 (step 104). The microcontroller 12 also controls the indicator lights 22 to turn on the "ON LOAD" light for Bank 1. When the voltage of one or both of batteries B1 and B2 drops below the minimum run voltage threshold (step 106), the microcontroller 12 controls the relays as follows:

open relays RY1A and RY1B to disconnect the service motor M1 from the batteries B1 and B2 (step 110);

close relays RY3A, RY3B, RY3C, RY5B and RY5C to connect the batteries B1 and B2 in parallel to the output of the alternator 16 to begin charging (step 112); and close relays RY2A, RY2B, RY5A and RY5D to run the service motor M1 and the drive motor M2 from the series combination of batteries B3 and B4 (step 114).

The microcontroller 12 also controls the indicator lights 22 to turn off the "ON LOAD" light and turn on the "CHARGING" light for Bank 1.

The microcontroller 12 continues monitoring the voltages of batteries B1 and B2 from ADC1 and ADC2 as those batteries are charging (step 116). If the voltages of batteries B1 and B2 are both below a minimum charge voltage threshold, such as 12.8 VDC (step 118), the microcontroller 12 closes or maintains closure of relays RY3A, RY3B, RY3C, RY5B and RY5C to continue charging the parallel combination of batteries B1 and B2 (step 112), and closes or maintains closure of relay RY5A and RY5D to continue running the drive motor M2 from the batteries B3 and B4. When both of batteries B1 and B2 have charged to above the minimum charge voltage threshold (step 118), the microcontroller 12 controls the relays as follows:

open relays RY3A, RY3B, RY3C, RY5B and RY5C to disconnect the batteries B1 and B2 from the output of the alternator 16 (step 120); and open relays RY5A and RY5D to disconnect the drive motor M2 from the series combination of batteries B3 and B4 (step 122). At this point, the service motor M1 is still being powered by the series combination of batteries B3 and B4. The microcontroller 12 also controls the indicator lights 22 to turn off the "CHARGING" light and turn on the "CHARGED FULL" light for Bank 1.

The microcontroller 12 is also monitoring the voltages of batteries B3 and B4 from ADC3 and ADC4 (step 124). If the voltages of batteries B3 and B4 are both above the minimum run voltage threshold, such as 12.2 VDC (step 126), the microcontroller 12 closes or maintains closure of relays RY2A and RY2B to provide 24 VDC power to the service motor M1 from the series combination of batteries B3 and B4 (step 128), and the microcontroller 12 continues monitoring the voltages of batteries B3 and B4 (step 124). The microcontroller 12 also controls the indicator lights 22 to turn on (or keep on) the "ON LOAD" light for Bank 2. When the voltage of one or both of batteries B3 and B4 drops below the minimum run voltage threshold (step 126), the microcontroller 12 controls the relays as follows:

open relays RY2A and RY2B to disconnect the service motor M1 from the batteries B3 and B4 (step 130);

close relays RY4A, RY4B, RY4C, RY5B and RY5C to connect the batteries B3 and B4 in parallel to the output of the alternator 16 to begin charging (step 132); and close relays RY1A, RY1B, RY5A and RY5D to run the service motor M1 and the drive motor M2 from the series combination of batteries B1 and B2 (step 134). The microcontroller 12 also controls the indicator lights 22 to turn off the "ON LOAD" light and turn on the "CHARGING" light for Bank 2.

The microcontroller 12 continues monitoring the voltages of batteries B3 and B4 from ADC3 and ADC4 (step 136). If the voltages of batteries B3 and B4 are both below the minimum charge voltage threshold, such as 12.8 VDC (step 138), the microcontroller 12 closes or maintains closure of relays RY4A, RY4B, RY4C, RY5B and RY5C to continue charging the parallel combination of batteries B3 and B4 (step 132), and closes or maintains closure of relay RY5A and RY5D to continue running the drive motor M2 from the series-connected batteries B1 and B2. When both of batteries B3 and B4 have charged to above the minimum charge voltage threshold (step 138), the microcontroller 12 controls the relays as follows:

open relays RY4A, RY4B, RY4C, RY5B and RY5C to disconnect the batteries B3 and B4 from the output of the alternator 16 (step 140); and open relays RY5A and RY5D to disconnect the drive motor M2 from the series combination of batteries B1 and B2 (step 122). At this point, the service motor M1 is still being powered by the series combination of batteries B1 and B2, and the process continues at step 104. The microcontroller 12 also controls the indicator lights 22 to turn off the "CHARGING" light and turn on the "CHARGED FULL" light for Bank 2.

In one embodiment of the invention which powers a golf cart, the functions of the drive motor M2 are performed by the service motor M1. In this embodiment, the drive train 14 is driven by a linkage from the golf cart's transmission system (represented by the load 20 in FIG. 1). Thus, in this embodiment, there is no need for the drive motor M2 or relays RY5A and RY5D.

It will be appreciated that the circuit 10 of FIG. 1 may also include components for controlling the speed of the service motor M1 and/or the drive motor M2. For example, if the service motor M1 is turning the drive train of an electric vehicle, a speed controller connected to an accelerator pedal would be provided to control the speed of the service motor M1 to control the speed of the vehicle. Also, a speed controller may be provided for the drive motor M2 to control the speed at which it turns the alternator 16, thereby controlling the output power of the alternator 16.

In some embodiments, the drive motor M2 is an alternating current (AC) motor powered by a DC-to-AC inverter connected to the series-connected batteries B1 and B2 or the series-connected batteries B3 and B4.

In some embodiments, the battery charging circuit 16 may be a generator.

In some embodiments, one or more of the relays may be replaced by power transistor switches to perform the switching operations described herein.

Figure 4A:
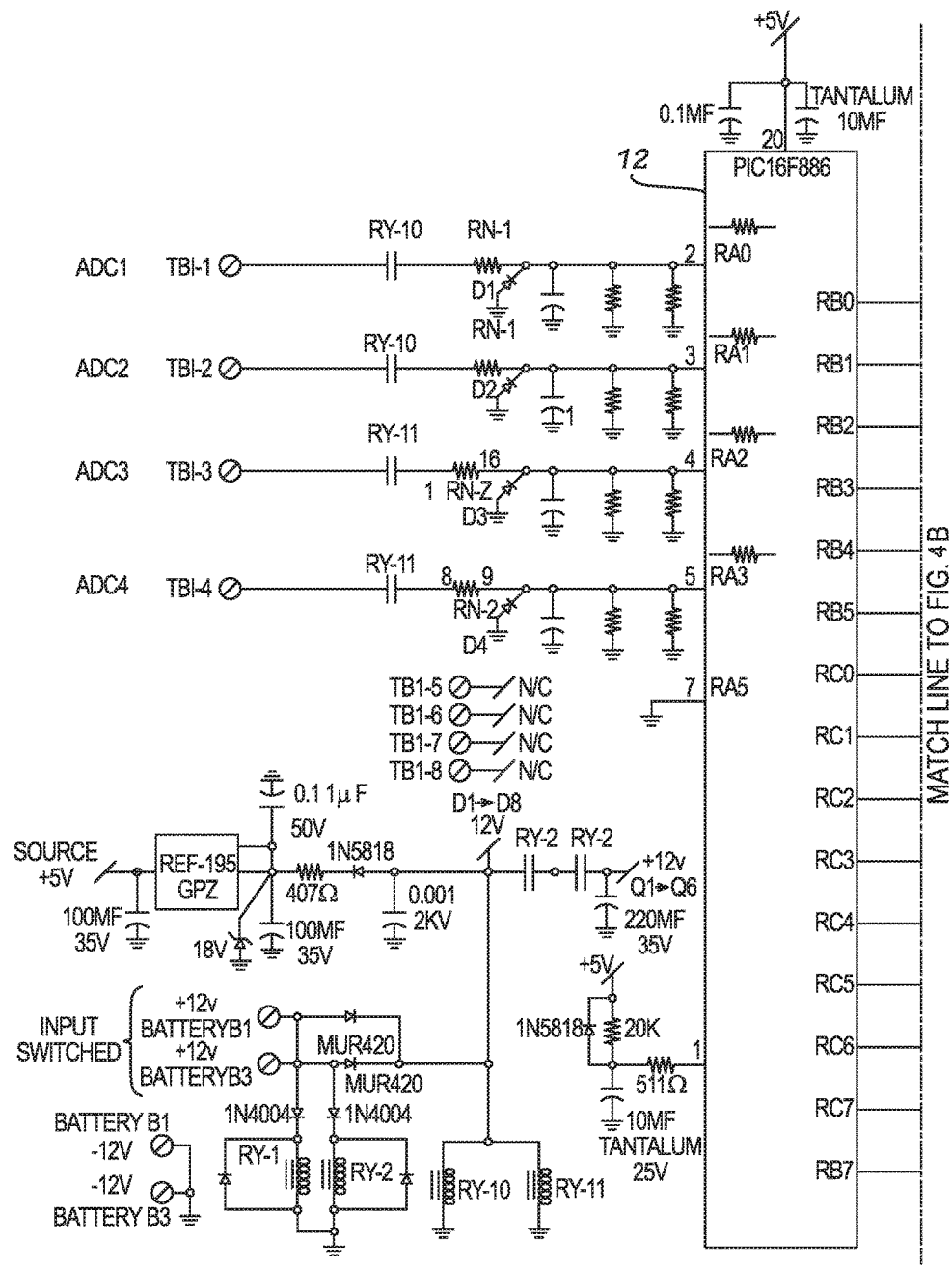
FIGS. 4A and 4B depict a wiring configuration for a microcontroller of a dual battery charging and discharging system.
Figure 4B:
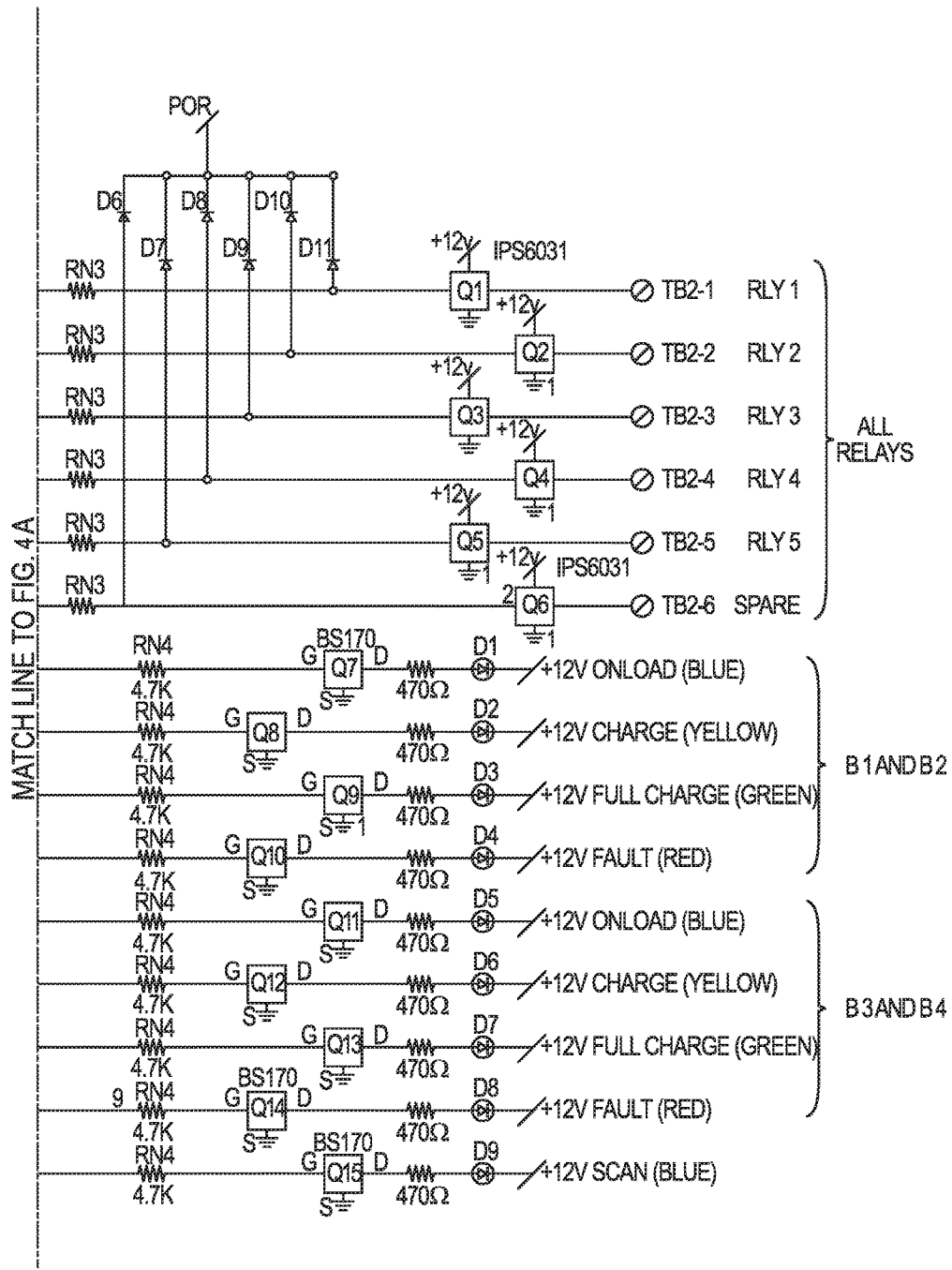

In some embodiments, the microcontroller 12 is a model PIC16F886 manufactured by Microchip Technology Inc. In these embodiments, the pin connections of the microcontroller 12 may be configured as depicted in FIGS. 4A and 4B.

In some embodiments, the microcontroller 12 is operable to sense when more power is needed by the service motor M1 than is available from either one of the first or second battery banks individually. This may occur, for example, when a high rate of acceleration is needed for a short time for an electric vehicle to pass another vehicle on the highway. In this situation, the microcontroller 12 may close the relays RY1A, RY2A, RY1B, and RY2B, while opening the relays RY3A and RY4A, thereby powering the service motor with the parallel combination of the first and second battery banks.

In some embodiments, the microcontroller 12 is operable to sense when no power is needed by the service motor M1, such as when the an electric vehicle is stopped at a red light or is parked. In this situation, the microcontroller 12 may disconnect battery power completely from the service motor M1 while continuing to alternately charge the first and second battery banks as necessary.

In a preferred embodiment of the invention, the microcontroller 12 performs a system scan once a minute to detect errors in the system. During the scan, the microcontroller 12 activates a scan LED 34, which is preferably blue.

Figure 5:
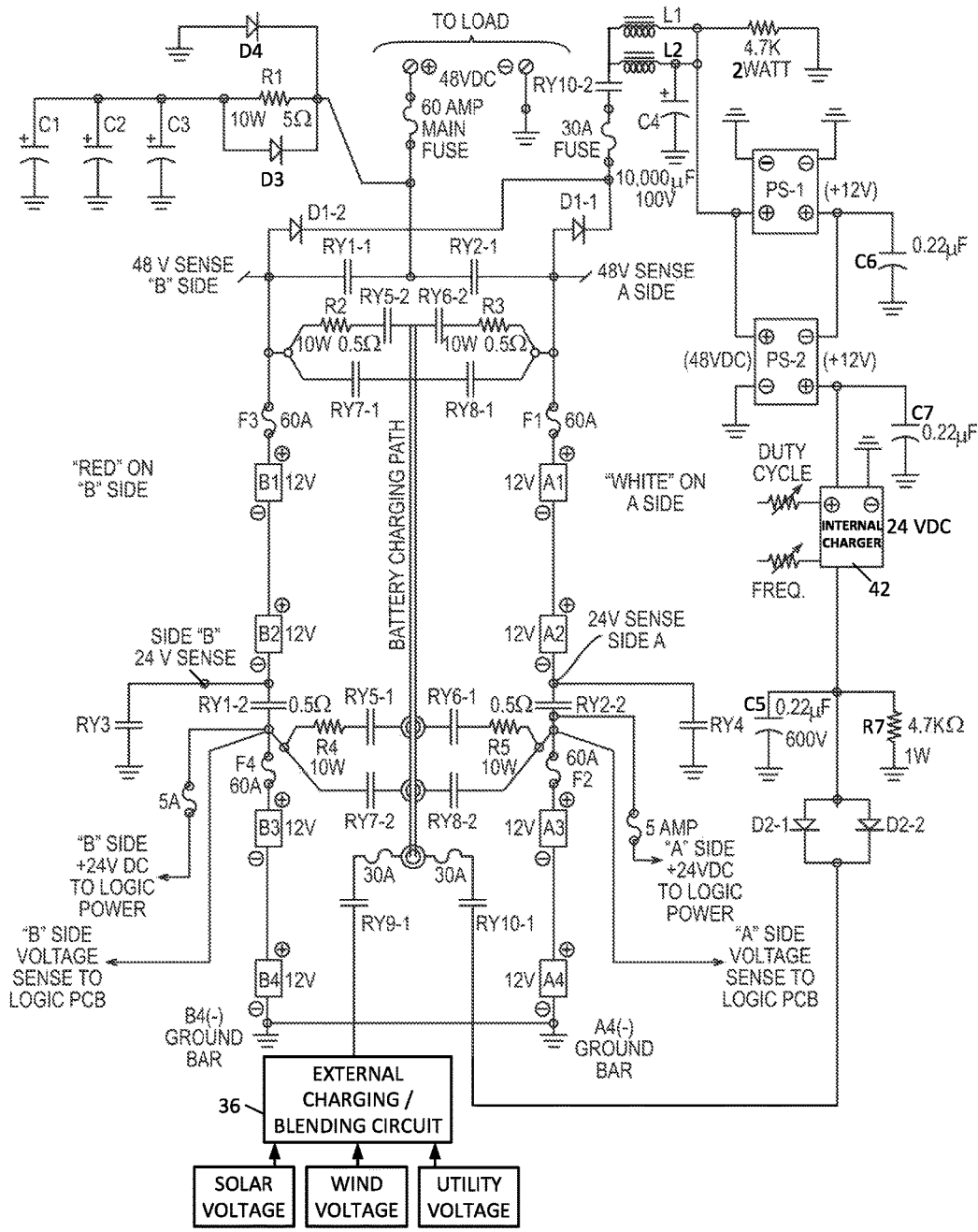
FIG. 5 depicts a wiring configuration of a relay logic circuit of a multiple battery charging and discharging system.
Figure 7:
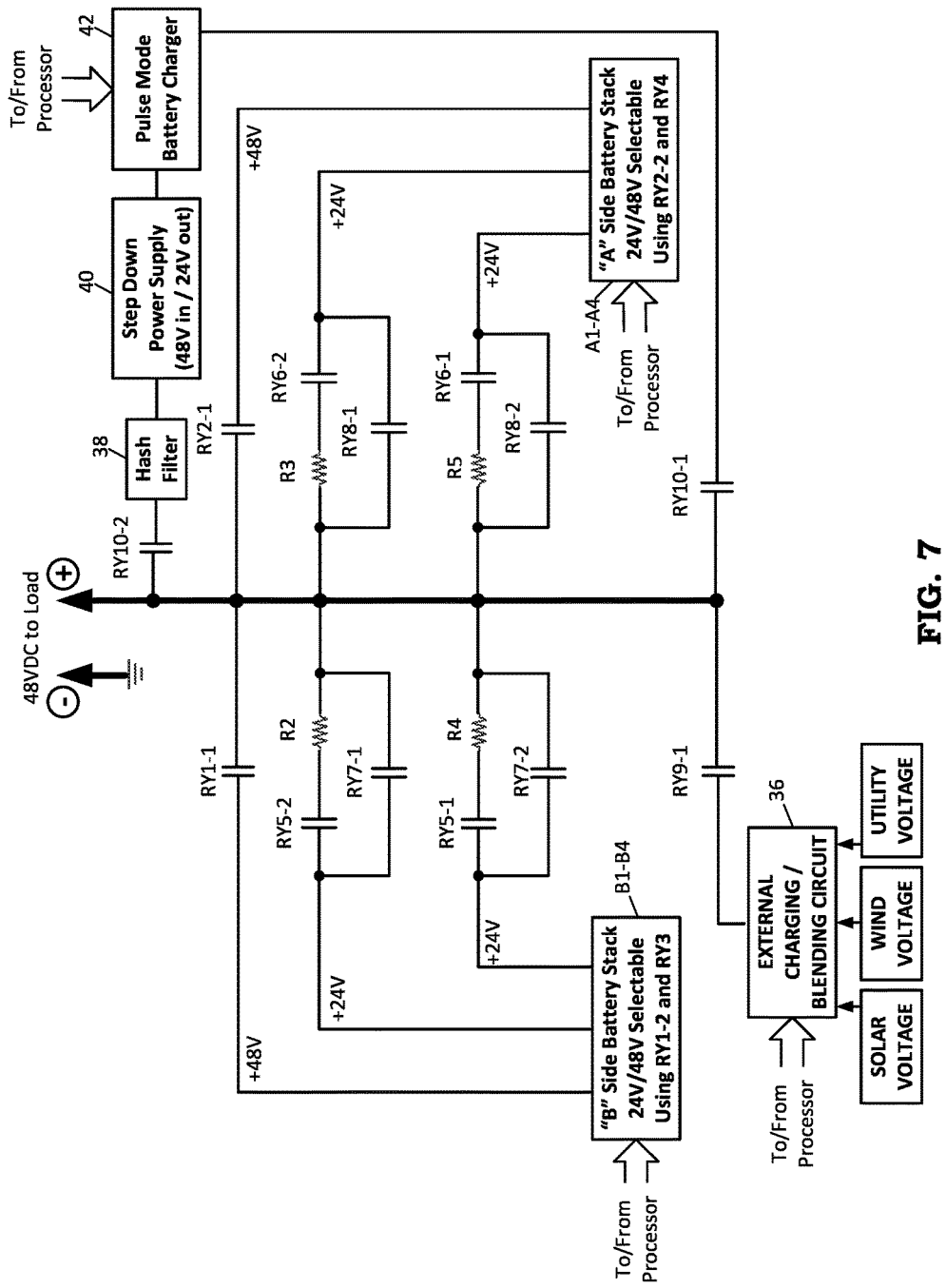
FIG. 7 depicts a functional block diagram of a multiple battery charging and discharging system.

Shown in FIGS. 5 and 7 are schematic diagrams of a relay logic circuit of a dual battery charging and discharging system according to a preferred embodiment. The following conditions apply to the logic circuit depicted in FIGS. 5 and 7.

All relays are normally open when not powered.

Relays RY1-1 and RY1-2 configure the "B" side battery bank into series 48V to supply load power. Relays RY1-1 and RY1-2 are also referred to herein as first switches.

Relays RY2-1 and RY2-2 configure the "A" side battery bank into series 48V to supply load power. Relays RY2-1 and RY2-2 are also referred to herein as second switches.

Relays RY1-1 and RY1-2 versus RY2-1 and RY2-2 are mutually exclusive for the "on" state. In other words, when RY1-1 and RY1-2 are "on," RY2-1 and RY2-2 are "off," and visa-versa. However, RY1-1, RY1-2, RY2-1 and RY2-2 may all be "off" simultaneously.

Relay RY3 connects the "B" side battery bank into a parallel 24V configuration for charging.

Relay RY4 connects the "A" side battery bank into a parallel 24V configuration for charging.

To set up the charging circuit, the following steps are performed in the listed order:

Sense low battery voltage, for example on the "B" side.

Activate and hold relays RY5-1 and RY5-2. Delay a few seconds to let both 24V stacks equalize.

Activate and hold relays RY7-1 and RY7-2. The 24V stack is now ready for charging, in this example on the "B" side only.

Relays RY8-1 and RY8-2 enable fast charging of the "A" side battery stack. Relays RY7-1 and RY7-2 enable fast charging of the "B" side battery stack.

Relays RY6-1 and RY6-2 enable slow charging of the "A" side battery stack. Relays RY5-1 and RY5-2 enable slow charging of the "B" side battery stack.

Relays RY3, RY4, RY5-1, RY5-2, RY6-1, RY6-2, RY7-1, RY7-2, RY8-1, and RY8-2 are also referred to herein as fourth switches.

Relays RY9-1, RY10-1 and RY10-2 are mutually exclusive for the "on" state. However, RY9-1, RY10-1 and RY10-2 may both be "off" simultaneously.

In the embodiment of FIG. 7, the external charging/blending circuit 36 and the internal charging circuit 42 are examples of a battery charging circuit. Relay RY9-1 enables the external charging/blending circuit 36 to receive charging power from external sources, such as from wind power generation, solar power generation or the electric utility grid. Relays RY10-1 and RY10-2 enables the internal charging circuit 42. In a preferred embodiment, the internal charging circuit 42 comprises a pulse mode equalization battery charger having variable charge rate, variable duty cycle, and variable frequency. In a preferred embodiment, these variable parameters are automatically determined by a microprocessor, such as the microcontroller 12, wherein their values are selected as necessary depending on the types of batteries being charged, such as lead acid, nickel cadmium, etc.

In the embodiment depicted in FIG. 5, the step down power supply (40 in FIG. 7) is implemented as two 12 VDC power supplies PS-1 and PS-2. In an alternative embodiment, the step down power supply 40 may be implemented as a single 24 VDC supply (48 VDC in, 24 VDC out).

Figure 6A:
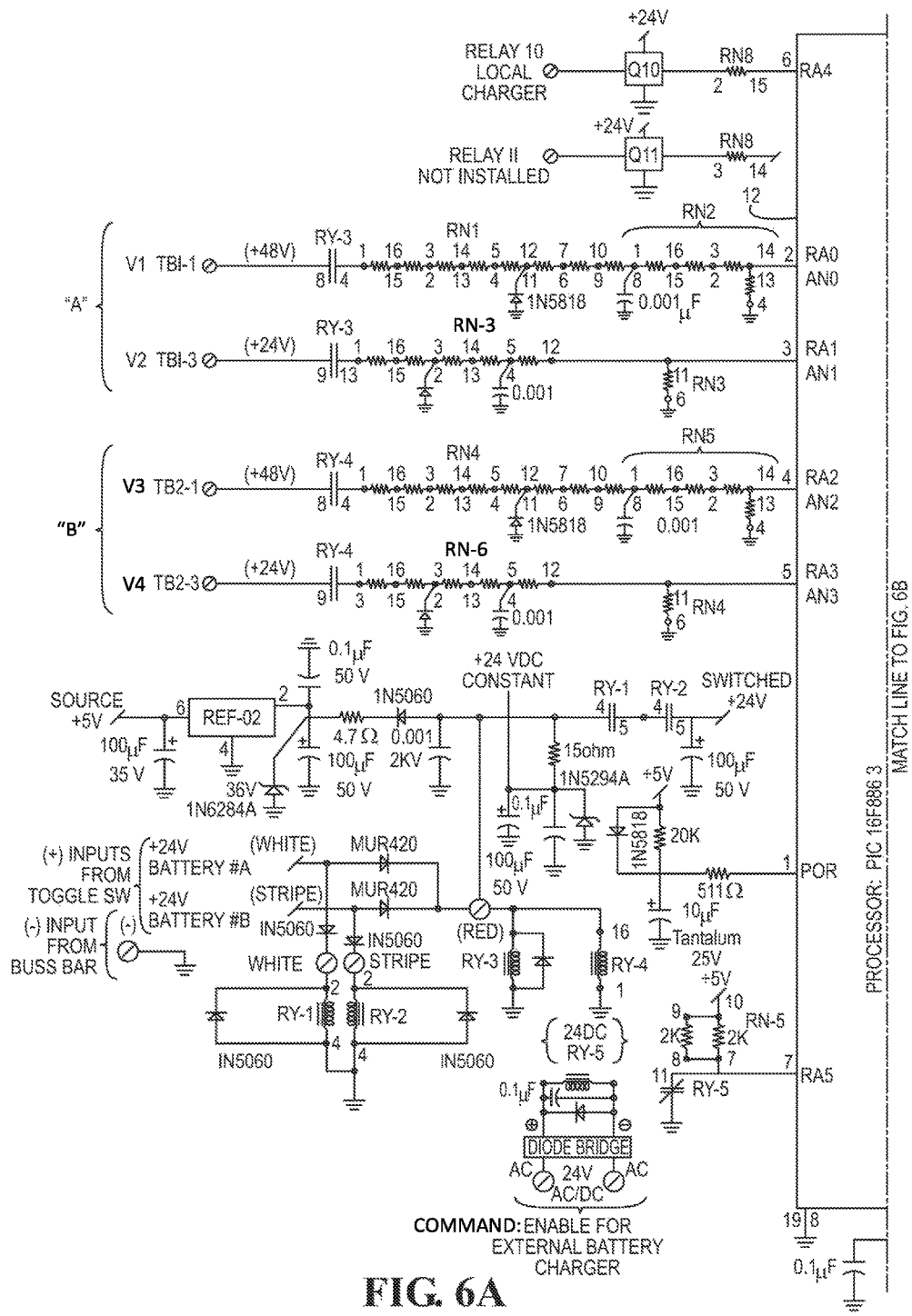
FIGS. 6A and 6B depict a schematic diagram of a battery controller of a multiple battery charging and discharging system.
Figure 6B:
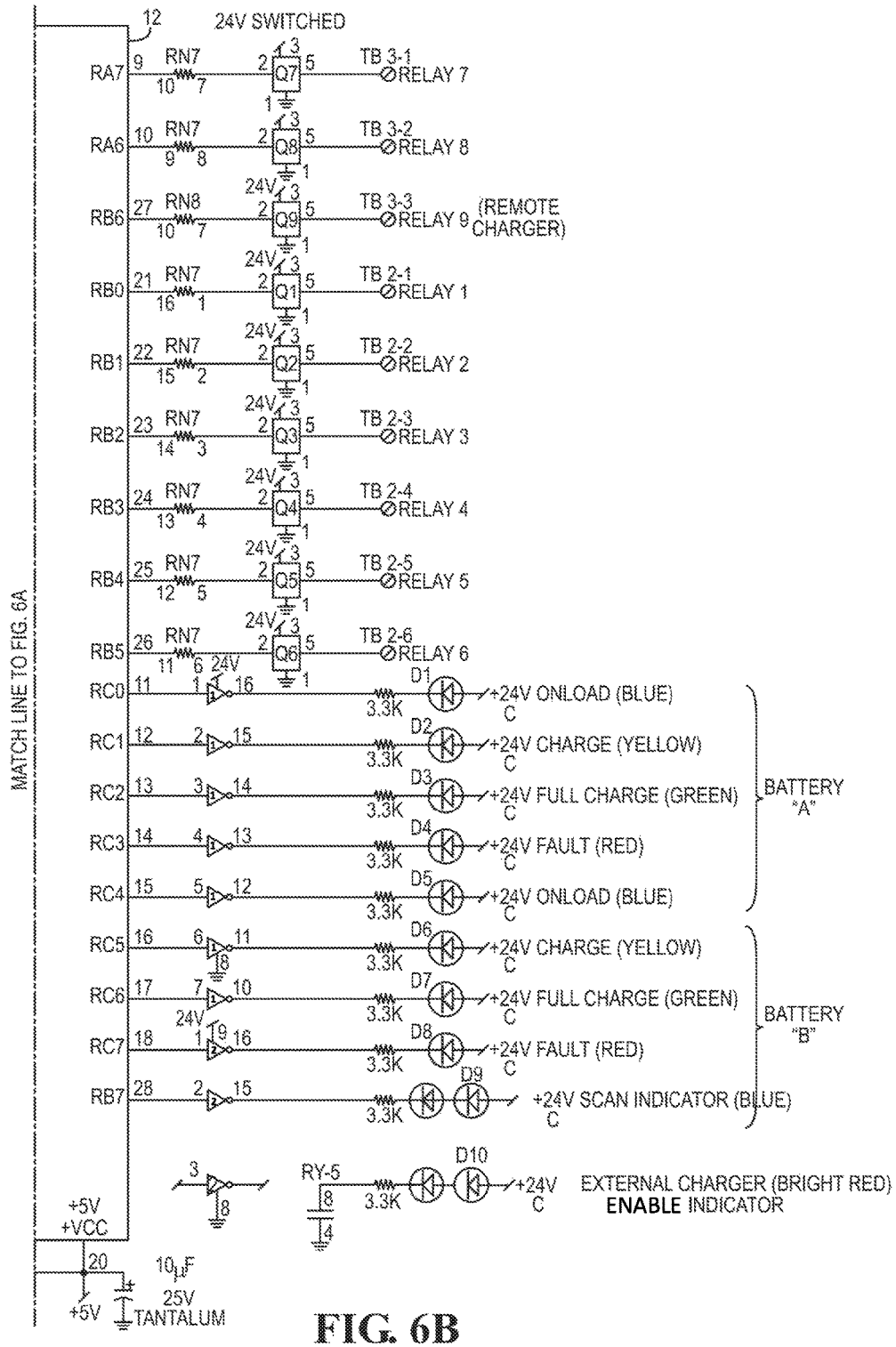

FIGS. 6A and 6B depict a schematic diagram of a battery controller of a multiple battery charging and discharging system according to a preferred embodiment.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. An apparatus for charging batteries and discharging batteries to power an electrical load, the apparatus comprising:
   a first battery bank comprising one or more batteries;
   a second battery bank comprising one or more batteries;
   a battery charging circuit operable to provide a charging voltage to one or more of the first battery bank and the second battery bank;
   one or more first switches operable to selectively connect or disconnect the first battery bank to or from the electrical load, thereby providing power to or removing power from the electrical load;
   one or more second switches operable to selectively connect or disconnect the second battery bank to or from the electrical load, thereby providing power to or removing power from the electrical load;
   one or more fourth switches operable to selectively connect the first battery bank to the battery charging circuit to receive the charging voltage and operable to selectively disconnect the second battery bank from the battery charging circuit; and
   the one or more fourth switches operable to selectively connect the second battery bank to the battery charging circuit to receive the charging voltage and operable to selectively disconnect the first battery bank from the battery charging circuit.

2. The apparatus of claim 1 further comprising a microcontroller operable to control one or more of the first, second, and fourth switches.

3. The apparatus of claim 2 wherein the microcontroller is operable to monitor voltages of one or more of the batteries comprising the first battery bank and voltages of one or more of the batteries comprising the second battery bank, and to control one or more of the first, second, and fourth switches based at least in part on the voltages monitored.

4. The apparatus of claim 1 wherein:
   the first battery bank comprises multiple batteries;
   the second battery bank comprises multiple batteries;
   the one or more first switches are operable to connect the multiple batteries of the first battery bank in series when providing power to one or more of the electrical load and the battery charging circuit;
   the one or more second switches are operable to connect the multiple batteries of the second battery bank in series when providing power to one or more of the electrical load and the battery charging circuit;
   the one or more fourth switches are operable to connect the multiple batteries of the first battery bank in parallel when receiving the charging voltage from the battery charging circuit; and
   the one or more fourth switches are operable to connect the multiple batteries of the second battery bank in parallel when receiving the charging voltage from the battery charging circuit.

5. The apparatus of claim 1 wherein one or more of the first, second, and fourth switches comprise relays.

6. The apparatus of claim 1 operable in a first mode wherein:
   the one or more first switches are configured to connect the first battery bank to provide power to the electrical load;
   the one or more second switches are configured to disconnect the second battery bank from the electrical load;
   the one or more fourth switches are configured to connect the second battery bank to the battery charging circuit to receive the charging voltage; and
   the one or more fourth switches are configured to disconnect the first battery bank from the battery charging circuit.

7. The apparatus of claim 1 operable in a second mode wherein:
   the one or more first switches are configured to disconnect the first battery bank from the electrical load;
   the one or more second switches are configured to connect the second battery bank to provide power to the electrical load;
   the one or more fourth switches are configured to connect the first battery bank to the battery charging circuit to receive the charging voltage; and
   the one or more fourth switches are configured to disconnect the second battery bank from the battery charging circuit.

8. The apparatus of claim 1 wherein the battery charging circuit receives and blends power from one or more of a solar power source, a wind power source and an electrical utility power grid, and provides a charging voltage to one or more of the first battery bank and the second battery bank.

9. The apparatus of claim 1 wherein:
   the first battery bank comprises two 12 volt batteries;
   the second battery bank comprises two 12 volt batteries;
   the electrical load comprises a 24 volt load; and
   the battery charging circuit receives 24 volt power from the first or second battery bank and provides a charging voltage of 12 volts.

10. The apparatus of claim 1 wherein:
the first battery bank comprises four 12 volt batteries;
the second battery bank comprises four 12 volt batteries;
the electrical load comprises a 48 volt load; and
the battery charging circuit receives 48 volt power from the first or second battery bank and provides a charging voltage of 24 volts.

11. The apparatus of claim 1 wherein the electrical load is selected from the group consisting of electrical lighting, electronic components, electrical appliances, an electric motor driving a transmission of an electric vehicle, an electric motor driving a propeller, and an electric motor driving an electrically-powered tool.

12. The apparatus of claim 1 wherein the electrical load comprises a residential power buss that provides power for home lighting, appliances and electronics.

13. A method for charging and discharging a first battery bank comprising one or more batteries and a second battery bank comprising one or more batteries, wherein the first and second battery banks selectively provide power to an electrical load, and a battery charging circuit generates a charging voltage, wherein the first and second battery banks selectively receive the charging voltage from the battery charging circuit, the method comprising:
(a) connecting the first battery bank to the electrical load to provide power to the electrical load;
(b) monitoring a voltage of one or more of the batteries of the first battery bank;
(c) after the voltage of one or more of the batteries of the first battery bank drops to or below a first threshold voltage,
(c1) disconnecting the first battery bank from the electrical load,
(c2) connecting the second battery bank to the electrical load to provide power to the electrical load,
(c3) connecting the first battery bank to the battery charging circuit to receive the charging voltage,
(c4) charging the first battery bank,
(d) after the voltage of one or more of the batteries of the first battery bank reaches or rises above a second threshold voltage, disconnecting the first battery bank from the battery charging circuit;
(e) monitoring a voltage of one or more of the batteries of the second battery bank;
(f) after the voltage of one or more of the batteries of the second battery bank drops to or below the first threshold voltage,
(f1) disconnecting the second battery bank from the electrical load,
(f2) connecting the first battery bank to the electrical load to provide power to the electrical load,
(f3) connecting the second battery bank to the battery charging circuit to receive the charging voltage; and
(f4) charging the second battery bank, and
(g) after the voltage of one or more of the batteries of the second battery bank rises to or above the second threshold voltage, disconnecting the second battery bank from the battery charging circuit.

14. The method of claim 13 wherein step (c3) further comprises connecting the batteries of the first battery bank in parallel, and step (f3) further comprises connecting the batteries of the second battery bank in parallel.

15. The method of claim 13 wherein steps (a) and (f2) further comprise connecting the batteries of the first battery bank in series, and step (c2) further comprises connecting the batteries of the second battery bank in series.

16. An apparatus for charging batteries and discharging batteries to power an electrical load, the apparatus comprising:
a first battery bank comprising one or more batteries;
a second battery bank comprising one or more batteries;
a battery charging circuit operable to provide a charging voltage to one or more of the first battery bank and the second battery bank; and
one or more switches operable to
selectively connect or disconnect the first battery bank or the second battery bank to or from the electrical load to provide power to or remove power from the electrical load,
selectively connect the first battery bank to the battery charging circuit to receive the charging voltage and selectively disconnect the second battery bank from the battery charging circuit, and
selectively connect the second battery bank to the battery charging circuit to receive the charging voltage and selectively disconnect the first battery bank from the battery charging circuit.

* * * * *